Figure 1:
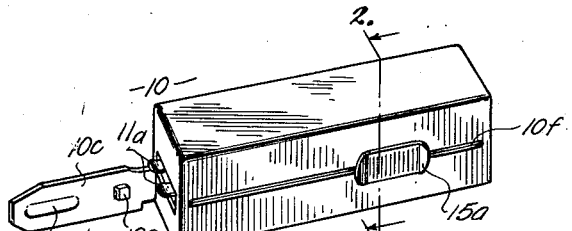

Sept. 2, 1952 J. C. FENNELLY 2,608,755
BLADE INJECTOR AND BLADE DISPOSAL DEVICE FOR INJECTOR TYPE RAZORS
Filed Dec. 7, 1946 3 Sheets-Sheet 1

Inventor
Joseph C. Fennelly
By Thos. E. Anfield
Attorney

Sept. 2, 1952  J. C. FENNELLY  2,608,755
BLADE INJECTOR AND BLADE DISPOSAL DEVICE FOR INJECTOR TYPE RAZORS
Filed Dec. 7, 1946  3 Sheets-Sheet 2

Inventor
Joseph C. Fennelly
By Thos. E. Scofield
Attorney

Sept. 2, 1952  J. C. FENNELLY  2,608,755
BLADE INJECTOR AND BLADE DISPOSAL DEVICE FOR INJECTOR TYPE RAZORS
Filed Dec. 7, 1946  3 Sheets-Sheet 3

Inventor
Joseph C. Fennelly
By Thos. E. Anfield
Attorney

Patented Sept. 2, 1952

2,608,755

UNITED STATES PATENT OFFICE 2,608,755

BLADE INJECTOR AND BLADE DISPOSAL DEVICE FOR INJECTOR TYPE RAZORS

Joseph C. Fennelly, Kansas City, Mo., assignor, by mesne assignments, of one-half to H. Struve Hensel, New York, N. Y.

Application December 7, 1946, Serial No. 714,722

8 Claims. (Cl. 30—40)

This invention relates to improvements in razor blade injectors and razor blade disposal devices, and refers more particularly to units adapted to be used with injector type razors or blade holders whereby a used blade can be transferred from the holder to the disposal device, and from the new blade magazine to the holder in successive operations without manually handling either blade.

The manipulation of safety razor blades in and out of a razor or blade holder under all circumstances and with any type razor must be performed with the greatest caution and care. The injector type blade holder, when used with a blade injector or blade changer, eliminates the hazards accompanying the insertion of a new blade into the holder, but offers no solution for the disposal of used blades. The injector and disposal device, by handling the blades in closed containers from the time the clip of new blades is charged to the magazine until they are returned to the manufacturer or disposed of as scrap, entirely eliminates razor blade hazards.

An object of the invention, therefore, is to provide a device readily fitted to a blade holder with attachments for removing the used blade from the holder and inserting a new blade without the necessity of manually handling either blade.

Another object is to provide an ejector and blade disposal unit equipped with a slide reciprocable between the magazine and blade disposal compartment adapted to transfer a used blade from the razor to the disposal compartment at one stroke of the slide, and a new blade from the magazine to the razor with the opposite stroke of the slide.

Other and further objects will appear from the following description.

Figure 2:
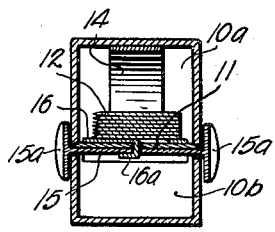
Figure 3:
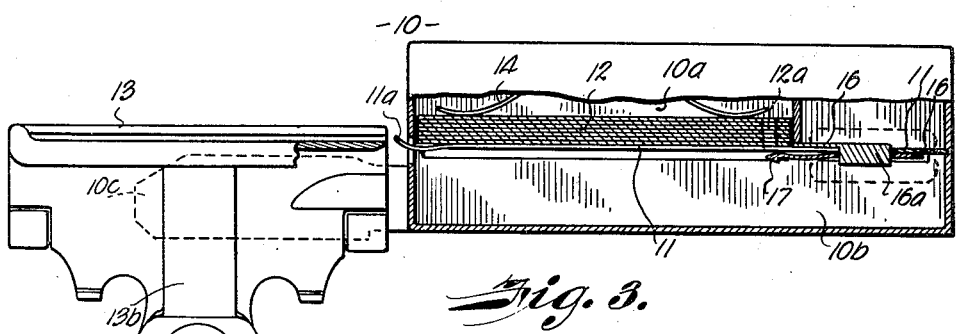
Figure 4:
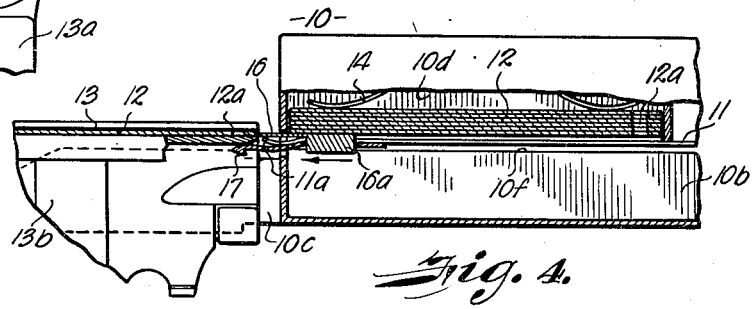
Figure 5:
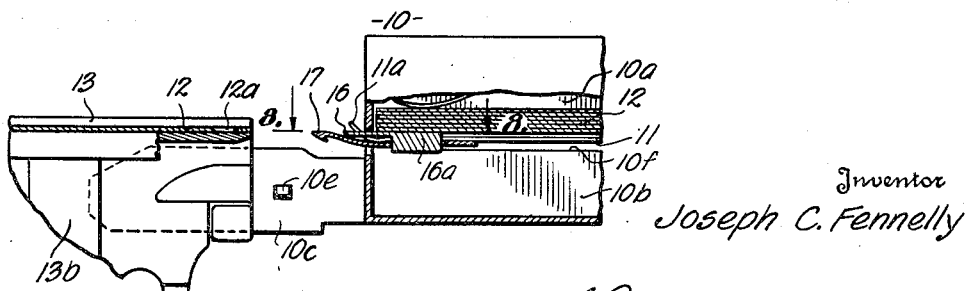
Figure 6:
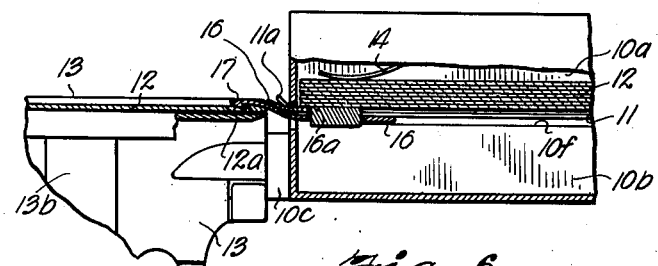

In the accompanying drawings which form a part of the specification and are to be read in conjunction therewith, and in which like reference numerals indicate like parts in the various views:

Fig. 1 is a perspective side view of a blade injector and disposal device embodying the invention, Fig. 2 is an enlarged section taken along the line 2—2 in Fig. 1 in the direction of the arrows, Fig. 3 is an enlarged side view of the injector and blade disposal device shown in position for the transfer of a blade with a portion of the side wall of the injector and disposal device broken away, Fig. 4 is a fragmentary view partly in section similar to Fig. 3 after a blade has been transferred from the magazine to the blade holder, Fig. 5 is a fragmentary section similar to Figs. 3 and 4 with the key or wedge member of the injector and blade disposal device partially withdrawn from the holder, Fig. 6 is a fragmentary section similar to Figs. 3, 4 and 5 with the key of the injector and blade disposal device reinserted into the holder and with the hook engaging member of the slide in position for withdrawal of the blade from the holder.

Figure 8:
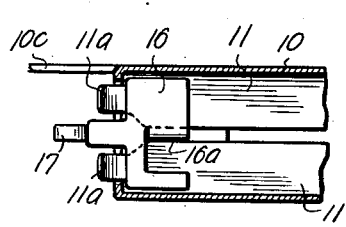
Figure 7:
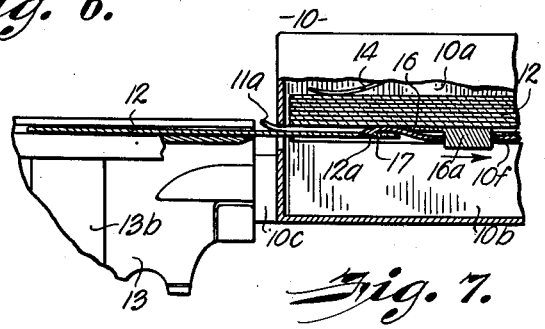
Figure 9:
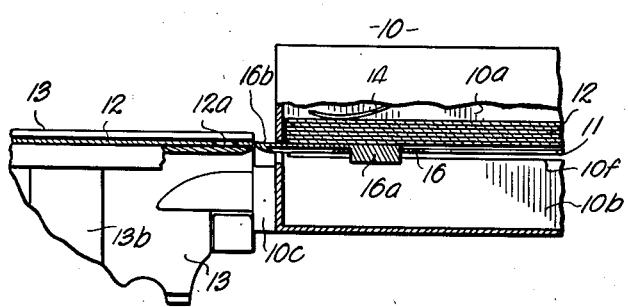
Figure 10:
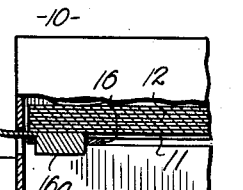
Figure 11:
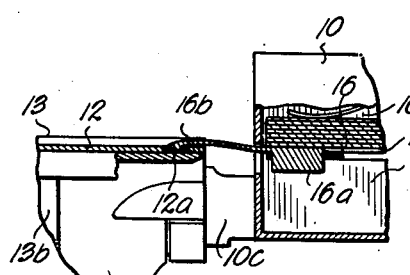
Figure 12:
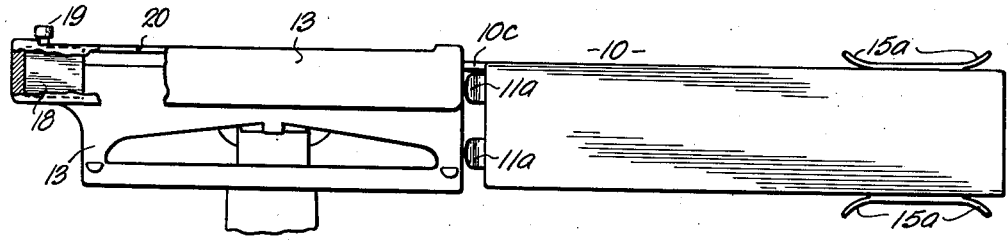
Figure 13:
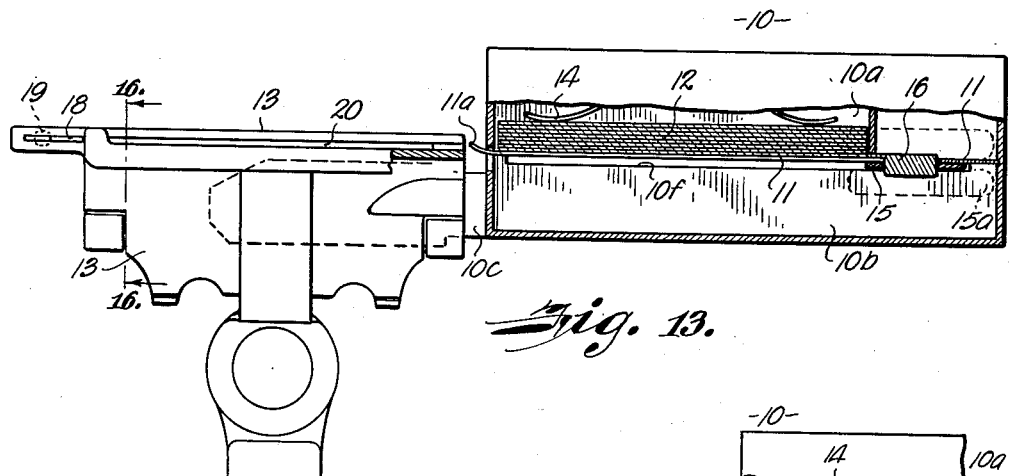
Figures 14, 15:
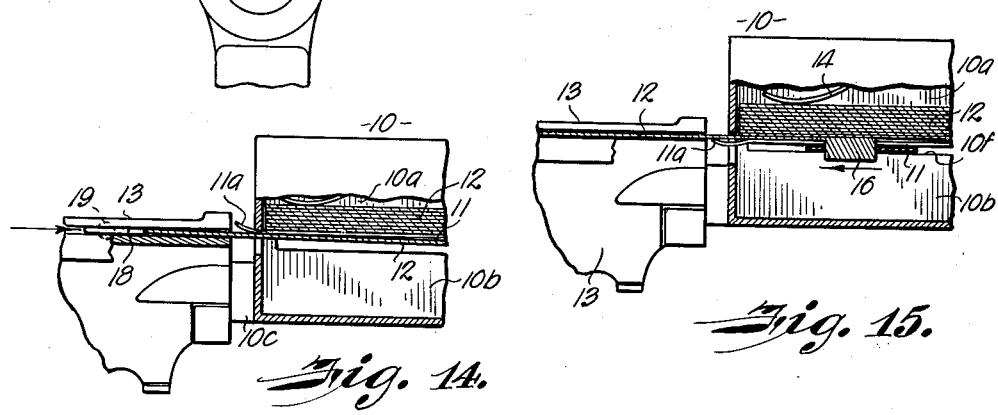
Figure 16:
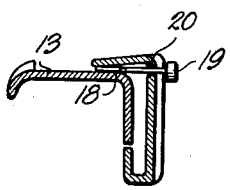

Fig. 7 is a similar view to that shown in Fig. 6 with the slide retracted and the used blade partially withdrawn from the holder, Fig. 8 is a view taken along the line 8—8 in Fig. 5 in the direction of the arrows, Fig. 9 is a view similar to Fig. 4 in which a modified type of blade transferring slide is used, Fig. 10 is a view corresponding to Fig. 5 in which the modified slide is employed, Fig. 11 is a view corresponding to Fig. 6 wherein the modified type of slide is shown engaging the used blade prior to withdrawal from the holder, Fig. 12 is a top plan view of a second modification in which the ejector for transferring a used blade from the holder to the disposal device is mounted on the head of the blade holder or razor, Fig. 13 is a front elevational view partly in section of the blade holder and injector device shown in Fig. 12 with the slide in position for transferring a new blade from the magazine to the holder, Fig. 14 is a fragmentary section of this second modification with a used blade about to be discharged from the holder to the blade disposal compartment of the injector, Fig. 15 is a fragmentary section of the second modification showing a new blade being inserted into the holder from the magazine, and Fig. 16 is a sectional view taken along the line 16—16 in Fig. 13 in the direction of the arrows.

Referring first to the structure shown in Figs. 1 to 8, inclusive, the blade injector and disposal device is designated as a whole by the numeral 10. The body portion of the injector is divided centrally by a partition or divider 11. The upper chamber 10a formed by the partition constitutes a magazine for a clip of blades 12. The lower chamber 10b is a used blade disposal compartment.

From one end of the body portion extends a key or wedge member 10c adapted to fit into a narrow passageway between blade holding members 13 of the razor. The blade holding members 13 are mounted on a handle 13a. The mounting of spring 13b with respect to the blade holding members 13 is such that the gripping effect of the blade holding members is released upon insertion of the key or wedge member 10c therebetween. The short ridge 10d and tongue 10e punched from the surface of the wedge shown in Fig. 1 serve to locate the injector properly with respect to the blade holder when the wedge is inserted. A bowed leaf spring 14 positioned above the clip of new blades in the magazine holds the blades firmly against the partition 11. A slide 15 reciprocable by means of side plates 15a longitudinally of the injector body is supported in slots 10f in the side walls of the body. The slide is located immediately below partition 11. The partition is centrally slotted to accommodate a web 16a punched from the ejector plate 16 which connects the plate to the slide 15. The slide in its retracted position shown in Fig. 3 is directly behind the end of the bottom blade of the stack of blades in the magazine. When the slide is moved longitudinally of the body, the front edge of plate 16 abutting the end of the blade slides it along partitions 11 into the gripping members 13 of the holder. Extending from the front of the slide is a flexible hook shaped member 17 adapted to engage a slotted opening 12a formed in the ends of the blades. The bifurcated ends of partition 11 are flexible and are slightly upturned, as shown at 11a, to direct the travel of the blades from the magazine to the holder and from the holder to the disposal compartment, as well as depress hook 17 while a new blade is being inserted in the holder.

The functioning of the device should be obvious from the description and drawings. The wedge 10c of the injector is slipped into the back of the blade holder between the flexibly mounted blade holding members 13. This spreads the members and permits easy insertion of a blade. Slide 15 is retracted to the end of the body as shown in Fig. 3 behind the bottom blade in the magazine. In this position hook 17 is depressed slightly below partition 11. The slide is then advanced toward the holder, plate 16 abutting the end of the blade moves it along the slotted partition 11 and between the blade holding members 13 of the holder. As the blade passes through the aperture in the body adjacent the holder the upturned ends 11a of the partition, as well as the hook 17, are depressed beneath the blade as shown in Fig. 4. Depression of the hook causes it to pass beneath the lower blade holding member as the new blade is inserted into the holder. The wedge of the injector may now be removed from engagement with the holder and the razor used.

To remove the blade from the holder and insert a new blade, the wedge is again fitted into the holder as shown in Fig. 5. It will be noted that the hook 17 is now in a raised position since upturned member 11a has sprung back after the passage of the blade into the holder. With complete insertion of the key or wedge, hook 17 overrides the top of the blade and drops into aperture 12a (see Fig. 6). Retraction of the slide as shown in Fig. 7 withdraws the blade from the holder and passes it beneath the upturned ends 11a of the partition. With the rearward stroke of the slide the used blade is withdrawn into disposal compartment 10b. At the end of the blade withdrawal stroke slide 15 is in the position shown in Fig. 3, ready to insert a new blade into the holder.

In the modification shown in Figs. 9, 10 and 11, the front of plate 16 is hook-shaped as shown at 16b. It has an arched shape and during its travel beneath the stack of blades in the magazine it assumes a horizontal position as shown in Fig. 9. The front end of the hook abuts the end of the bottom blade in the magazine and transfers it from the magazine to the holder as the slide is moved longitudinally of the body. In Fig. 9 the slide is shown in its advanced position when the new blade has been pushed home between gripping members 13 of the holder. To remove the blade from the holder the injector wedge 10c is removed or partially removed from the holder as shown in Fig. 10. The slide is then advanced so the hooked end of the plate 16b is permitted to arch upwardly as shown in Fig. 10. The wedge of the injector is again pushed home in the holder as shown in Fig. 11, causing hook 16b to override the top of the blade and engages aperture 12a. Retraction of the slide pulls the used blade into the disposal compartment 10b as before.

In the second modification shown in Figs. 12 to 16, inclusive, an ejector plate 18 located between the holding members 13 of the razor ejects the used blade from the holder, serving the function of the hooked members of the slide. In this second modification the body member and wedge of the injector and blade disposal device are similar in construction to the preceding types. The body member 10 is divided centrally by partition 11 into an upper magazine 10a and a lower blade disposal compartment 10b. The slide, however, consists of a plate 15 below the partition and a blade abutment plate 16 above the partition reciprocable in slots 10f. The partition 11 has bifurcated upturned ends 11a as before.

An ejector plate 18 reciprocable in a narrow passageway between the upper flanges of the blade holding members is shown in Figs. 12, 13 and 16. Ejector 18 is manually moved across the head of the holder by means of button 19 attached to the ejector plate by a narrow neck which extends through slotted opening 20 at the back of the razor head.

To insert a blade from the magazine to the holder in this modification the slide 15 is retracted until the edge of plate 16 abuts the end of the bottom blade in the magazine as shown in Fig. 13. The slide is then advanced and the bottom blade moved into the holder as shown in Fig. 15. During the transfer of the blade the upturned ends 11a of the magazine are depressed. After the blade has been inserted into the holder the ends 11a of the partition spring up and take the position shown in Fig. 14. With the blade lodged in the razor head between the blade holding members, ejector plate 18 abuts the opposite end of the blade. To eject the blade from the razor head ejector plate 18 is manually slid toward the injector and blade disposal device moving the blade with it in the direction shown by the arrow in Fig. 14. The blade is directed beneath upturned members 11a and into the disposal compartment 10b of the injector.

By these three different structures, a used blade may be withdrawn from the blade holding head of a razor into the disposal compartment of the injector and a new blade discharged from the magazine into the razor head without manually handling either. Furthermore, there is not only provided an enclosed magazine for the new blades, but a simple, compact and safe disposal container for the used blades.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A razor blade injector and disposal device adapted for use with a holder to eject and inject blades, comprising a body portion divided by a partition into a new blade magazine and a used blade disposal compartment, a slide positioned adjacent the partition and movable longitudinally thereof, said slide adapted to engage with and transfer a blade from the holder into the disposal compartment at one stroke, and engage with and transfer a blade into the holder from the magazine upon reversal of the stroke, said partition or divider between the magazine and disposal compartment having a flexible upturned end adapted to be raised to pass over the blade transferred from the holder to the disposal compartment and depressed beneath the blade passing from the magazine to the holder.

2. A razor blade injector and disposal device operative with a blade holder having a blade passageway, comprising a housing divided into a new blade magazine and a used blade compartment, said housing having in one wall thereof a slot common to said magazine and compartment, means for temporarily securing said housing to the blade holder so the slot registers with said blade passageway, a partition between said magazine and said compartment having an upturned end projecting through the slot, a slide reciprocable along the partition, a member carried by the slide on one side of the partition to urge a blade from the magazine through said slot and over the upturned end of the partition into the passageway in said holder when the slide is moved in one direction, and a member carried by the slide on the other side of the partition engageable with a blade in said passageway to draw same through the slot and under the upturned end of the partition into said compartment when the slide is moved in the reverse direction.

3. A device as in claim 2 wherein said upturned end of the partition is bifurcated and said last member comprises a spring hook under the partition aligned with the space between the bifurcations and tensioned upwardly to enter said space when the slide is moved toward said one end of the partition.

4. A razor blade injector and disposal device operative with a holder, comprising a housing divided into a new blade magazine and a used blade compartment, said housing having in one wall thereof a slot common to said magazine and compartment, through which slot blades pass from the magazine to said holder and from the holder to the compartment, a partition between the magazine and compartment having a flexible upturned end projecting through said slot, said end adapted to be depressed beneath a blade travelling from the magazine to the holder and raised to pass over a blade travelling from the holder to the compartment.

5. A combined blade magazine and receiver for safety razor blades, comprising a horizontally elongated housing having a longitudinal partition dividing same into upper and lower compartments, said housing having in one wall a blade passage opening communicating with said compartments, a stack of blades in one compartment spring pressed toward said partition, a feed slide mounted to reciprocate along said partition and having oppositely directed blade engaging elements upon its opposite faces for moving blades respectively into and out of the compartments, said elements being approximately in vertical register whereby the respective elements engage the same end of a blade in moving the blade either into or out of the compartments.

6. A combined blade magazine and receiver for safety razor blades, comprising an elongate housing having a longitudinal partition dividing same into a new blade magazine and a used blade compartment, said housing having in one wall a blade passage opening communicating with said magazine and compartment, a stack of blades in said magazine spring pressed toward said partition whereby the bottom blade of the stack rests thereon, a manually operable slide reciprocable along said partition, blade discharging and retracting elements for moving blades out of said magazine and into said compartment upon movements of said slide in opposite directions, said discharging element comprising a thrust member on said slide adapted upon movement of the slide in one direction to abut the end of the bottom blade in said stack and push same along the partition ahead of the slide, thereby to drive the blade out of said magazine, and said retracting element comprising a member projecting forwardly of the slide and having a hook underlying the trailing end of the bottom blade in said stack during the advance thereof out of the magazine.

7. A combined blade magazine and receiver for razor blades comprising a horizontally elongated housing having a longitudinal partition dividing same into upper and lower compartments, said housing having in one end a blade passage opening, communicating with both compartments, a stack of blades in the upper compartment spring pressed downwardly so the bottom blade rests on said partition, a feed slide mounted to reciprocate along the partition, a thrust member on said slide adapted upon movement of the slide in one direction to abut the end of the bottom blade in said stack and push same along the partition ahead of the slide, thereby to drive the blade out of said magazine through said opening, a member projecting forwardly of said slide and having a hook underlying the trailing end of said bottom blade during the advance thereof, stop means for halting the advance of said slide in said one direction when said hook projects from the housing through said opening by a distance less than the length of one of said blades, said hook effective upon a return movement of the slide to re-enter said housing and travel within said compartment for a distance substantially equal to the length of one of said blades for moving a blade into said compartment.

8. A combined blade magazine and receiver as in claim 7 wherein said hook-carrying member is tensioned upwardly so the hook occupies a position above the plane of the bottom blade in said stack when said member projects in free, unrestrained condition from the housing through said opening.

JOSEPH C. FENNELLY.

REFERENCES CITED

The following references are of record in the file of this patent:

UNITED STATES PATENTS

| Number | Name | Date |
| --- | --- | --- |
| 1,825,429 | Straus | Sept. 29, 1931 |
| 2,226,964 | Benjamin | Dec. 31, 1940 |
| 2,270,790 | Stampleman | Jan. 20, 1942 |
| 2,312,453 | Testi | Mar. 2, 1943 |
| 2,330,639 | Testi | Sept. 28, 1943 |
| 2,397,890 | Testi | Apr. 12, 1946 |
| 2,446,715 | Muros | Aug. 10, 1948 |
| 2,454,197 | Muros | Nov. 16, 1948 |
| 2,562,513 | Shnitzler | July 31, 1951 |